(12) United States Patent
Kawana et al.

(10) Patent No.: US 9,879,379 B2
(45) Date of Patent: Jan. 30, 2018

(54) WATER/OIL RESISTANT COMPOSITION, ARTICLE TREATED THEREWITH, AND PROCESSES FOR THEIR PRODUCTION

(71) Applicant: Asahi Glass Company, Limited, Tokyo (JP)

(72) Inventors: Junsuke Kawana, Tokyo (JP); Shuichiro Sugimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/666,668

(22) Filed: Mar. 24, 2015

(65) Prior Publication Data

US 2015/0191874 A1    Jul. 9, 2015

Related U.S. Application Data

(60) Division of application No. 13/470,636, filed on May 14, 2012, now abandoned, which is a continuation of application No. PCT/JP2010/070142, filed on Nov. 11, 2010.

(30) Foreign Application Priority Data

Nov. 13, 2009    (JP) ................................. 2009-260164

(51) Int. Cl.
*D21H 19/20* (2006.01)
*C08F 220/24* (2006.01)
*D21H 21/16* (2006.01)
*C09K 3/18* (2006.01)
*C08F 222/10* (2006.01)
*C08F 220/36* (2006.01)
*C08F 220/20* (2006.01)
*D21H 17/34* (2006.01)

(52) U.S. Cl.
CPC .......... *D21H 19/20* (2013.01); *C08F 220/24* (2013.01); *C09K 3/18* (2013.01); *D21H 21/16* (2013.01); *C08F 220/20* (2013.01); *C08F 220/36* (2013.01); *C08F 222/1006* (2013.01); *D21H 17/34* (2013.01); *Y10T 428/3154* (2015.04)

(58) Field of Classification Search
CPC ........ D21H 19/20; D21H 21/16; D21H 17/34; C08F 220/24; C08F 222/1006; C08F 220/36; C08F 220/20; C09K 3/18; Y10T 428/3154
See application file for complete search history.

(56) References Cited

U.S. PATENT DOCUMENTS

| | | | |
|---|---|---|---|
| 4,127,711 A | 11/1978 | Lore et al. | |
| 4,147,851 A | 4/1979 | Raynolds | |
| 4,366,299 A | 12/1982 | Dessaint | |
| 4,444,955 A | 4/1984 | Mels et al. | |
| 4,857,577 A * | 8/1989 | Buter ..................... | C08F 279/02 524/458 |
| 5,115,013 A * | 5/1992 | Rottger ................. | C08F 283/00 524/457 |
| 5,439,998 A | 8/1995 | Lina et al. | |
| 5,578,688 A | 11/1996 | Ito et al. | |
| 5,584,917 A * | 12/1996 | Kijima ..................... | C09K 3/18 106/2 |
| 6,111,043 A | 8/2000 | Corpart et al. | |
| 6,326,447 B1 | 12/2001 | Fitzgerald | |
| 6,566,470 B2 | 5/2003 | Kantamneni et al. | |
| 7,404,876 B2 | 7/2008 | Ono et al. | |
| 7,446,145 B2 | 11/2008 | Hashimoto et al. | |
| 7,485,688 B2 | 2/2009 | Maekawa et al. | |
| 7,976,583 B2 | 7/2011 | Goetz et al. | |
| 8,071,489 B2 | 12/2011 | Huang et al. | |
| 2003/0130457 A1 | 7/2003 | Maekawa et al. | |

(Continued)

FOREIGN PATENT DOCUMENTS

| | | |
|---|---|---|
| EP | 1 298 180 A1 | 4/2003 |
| JP | 50-018371 | 2/1975 |
| JP | 56 118995 | 9/1981 |
| JP | 56-131612 | 10/1981 |
| JP | 07-206942 | 8/1995 |
| JP | 2001-504546 | 4/2001 |
| JP | 2004-262970 | 9/2004 |
| JP | 2009-102771 | 5/2009 |
| JP | 2009-209312 | 9/2009 |
| WO | WO 2005/090423 | 9/2005 |
| WO | WO 2008/022985 | 2/2008 |
| WO | WO 2008/106209 | 9/2008 |

OTHER PUBLICATIONS

Machine translation of JP 56-118995A, Aug. 2016.*

(Continued)

*Primary Examiner* — Nicole Buie-Hatcher
(74) *Attorney, Agent, or Firm* — Oblon, McClelland, Maier & Neustadt, L.L.P.

(57) ABSTRACT

To provide a water/oil resistant composition this imparts a sufficient water/oil resistance to a base material when a fluorinated copolymer having an $R^f$ group with at most 6 carbon atoms is used. The water/oil resistance is not substantially influenced by an adjuvant or the pH of dilution water, and the composition has little odor. Also provided are a treated article and production processes. The water/oil resistant composition has a fluorinated copolymer dispersed or dissolved in a medium, and the fluorinated copolymer is one having one, some or all of amino groups in a fluorinated copolymer comprising structural units based on a monomer (a) having a $C_{1-6}$ $R^f$ group and structural units based on a monomer (b) having an amino group, converted to form a salt with an organic acid comprising an organic acid having a pKa of from 2.0 to 4.0.

15 Claims, No Drawings

(56) References Cited

U.S. PATENT DOCUMENTS

| | | | |
|---|---|---|---|
| 2005/0267241 A1* | 12/2005 | Sugimoto | C08F 220/22 |
| | | | 524/366 |
| 2006/0005317 A1 | 1/2006 | Hashimoto et al. | |
| 2007/0219331 A1* | 9/2007 | Ishikawa | C08F 214/18 |
| | | | 526/245 |
| 2008/0202384 A1 | 8/2008 | Peng et al. | |
| 2009/0191419 A1 | 7/2009 | Yukawa et al. | |

OTHER PUBLICATIONS

International Search Report dated Jan. 18, 2011 in PCT/JP2010/070142 filed Nov. 11, 2010.
Extended Search Report dated Dec. 9, 2013 in European Patent Application No. 10829998.3.

* cited by examiner

WATER/OIL RESISTANT COMPOSITION, ARTICLE TREATED THEREWITH, AND PROCESSES FOR THEIR PRODUCTION

CROSS-REFERENCE TO RELATED APPLICATIONS

This is a divisional of application Ser. No. 13/470,636, filed May 14, 2012, which is a continuation of International Application No. PCT/JP2010/070142, filed Nov. 11, 2010, which claimed priority to Japanese application no. 2009-260164, filed Nov. 13, 2009, of which all of the disclosures are incorporated herein by reference in their entireties.

TECHNICAL FIELD

The present invention relates to a water/oil resistant composition, an article treated therewith, and processes for their production.

BACKGROUND ART

Water/oil resistant paper (hereinafter referred to as fluorinated water/oil resistant paper) obtained by treating paper with a water/oil resistant composition containing a fluorinated copolymer having perfluoroalkyl groups (hereinafter referred to as $R^F$ groups), has a barrier property against a liquid such as water or oil and thus is used as e.g. wrapping paper for food products or a packaging container for food products. Further, fluorinated water/oil resistant paper has good water resistance and oil resistance while maintaining air permeability, as different from water/oil resistant paper other than the fluorinated type, and thus, it is used also as wrapping paper for fried products which disfavor moisture remaining inside, as wrapping paper for a freshness-keeping agent which requires air permeability for its function, or as wrapping paper for a deoxidant.

The following two types of methods are available as a method for treating paper with a water/oil resistant composition.

(1) A method so-called "internal sizing" wherein a water/oil resistant composition is added to a pulp slurry before paper-making.

(2) A method so-called "external sizing" wherein a water/oil resistant composition is applied to paper in size press coating after paper-making, wet pressing and preliminary drying, or a water/oil resistant composition is applied to paper after preparation of base paper by means of various coaters or various printing machines.

As a water/oil resistant composition containing a fluorinated copolymer, the following one is, for example, known.

A water/oil resistant composition having a fluorinated copolymer dispersed or dissolved in an aqueous medium, wherein the fluorinated copolymer is one obtained by converting amino groups with an acid to form a salt in a fluorinated copolymer obtained by copolymerizing a (meth)acrylate having a polyfluoroalkyl group (hereinafter referred to as an $R^f$ group), a dialkylaminoalkyl (meth)acrylate and a vinyl monomer such as vinyl acetate (Patent Document 1).

In such a water/oil resistant composition, as the acid to be used for conversion of amino groups to form a salt, acetic acid is employed from the viewpoint of the safety and price.

However, the water/oil resistant composition obtained by using acetic acid for conversion of amino groups to form a salt, has the following problems.

(i) The fluorinated copolymer having amino groups converted to form a salt is cationic, and therefore, if an anionic adjuvant is used at the time of treating paper, not only no adequate water/oil resistance can be obtainable, but also agglomerates are likely to be formed thus leading to a trouble in the operation.

(ii) In the external sizing, there may be a case where water having a high pH (e.g. water having a pH of at least 8) is used as dilution water, or in the internal sizing, there may be case where a pulp having a high pH is used. Also in such a case, not only no adequate water/oil resistance can be obtainable, but also agglomerates are likely to be formed, thus leading to a trouble in the operation.

(iii) There is an odor specific to acetic acid.

In recent years, there has been a concern about an environmental load due to fluorinated compounds having $R^F$ groups with at least 8 carbon atoms such as perfluorooctanoic acid and its precursor, analogues, etc., and an attempt is being made by e.g. US Environmental Protection Agency, to reduce their accumulation in the environment. Therefore, a substitute water/oil resistant composition is desired which contains a fluorinated copolymer having $R^F$ groups with at most 6 carbon atoms or perfluoropolyether (Patent Document 2).

However, a substitute water/oil resistant composition obtained by converting amino groups with acetic acid to form a salt in a fluorinated copolymer having $R^F$ groups with at most 6 carbon atoms or perfluoropolyether, is inadequate in the water/oil resistance, as compared with a conventional water/oil resistant composition obtained by converting amino groups with acetic acid to form a salt in a fluorinated copolymer having $R^F$ groups with at least 8 carbon atoms.

PRIOR ART DOCUMENTS

Patent Documents

Patent Document 1: JP-A-2001-504546
Patent Document 2: WO2005/090423

DISCLOSURE OF INVENTION

Technical Problem

The present invention is to provide a water/oil resistant composition which can impart a sufficient water/oil resistance to a base material even though a fluorinated copolymer having $R^f$ groups with at most 6 carbon atoms or perfluoropolyether is used, said water/oil resistance being not substantially influenced by an adjuvant or the pH of dilution water, and which has little odor; an article having a sufficient water/oil resistance with a low environmental load; and processes for their production.

Solution to Problem

The water/oil resistant composition of the present invention is a water/oil resistant composition having a fluorinated copolymer dispersed or dissolved in a medium, wherein the fluorinated copolymer is one having some or all of —N($R^5$)($R^6$) in a fluorinated copolymer comprising from 50 to 98 mass % of structural units based on the following monomer (a) and from 2 to 50 mass % of structural units based on the following monomer (b), converted to form a salt with an organic acid comprising an organic acid having a pKa of from 2.0 to 4.0, Monomer (a): a compound represented by the following formula (1):

$$(Z-Y)_n X \tag{1}$$

wherein Z is a $C_{1-6}$ $R^f$ group or a group represented by the following formula (2), Y is a bivalent organic group or a single bond, n is 1 or 2, and X is any one of groups represented by the following formulae (3-1) to (3-5) when n is 1, or any one of groups represented by the following formulae (4-1) to (4-4) when n is 2, $$C_mF_{2m+1}O(CF_2CF(CF_3)O)_dCF(CF_3)— \quad (2)$$

wherein m is an integer of from 1 to 6, and d is an integer of from 1 to 4, $$—C(R)=CH_2 \quad (3-1)$$

$$—C(O)OC(R)=CH_2 \quad (3-2)$$

$$—OC(O)C(R)=CH_2 \quad (3-3)$$

$$—OCH_2-\varphi-C(R)=CH_2 \quad (3-4)$$

$$—OCH=CH_2 \quad (3-5)$$

wherein R is a hydrogen atom, a methyl group or a halogen atom, and φ is a phenylene group, $$—CH[—(CH_2)_pC(R)=CH_2]— \quad (4-1)$$

$$—CH[—(CH_2)_pC(O)OC(R)=CH_2]— \quad (4-2)$$

$$—CH[—(CH_2)_pOC(O)C(R)=CH_2]— \quad (4-3)$$

$$—OC(O)CH=CHC(O)O— \quad (4-4)$$

wherein R is a hydrogen atom, a methyl group or a halogen atom, and p is an integer of from 0 to 4, Monomer (b): a compound represented by the following formula (5):

$$CH_2=C(R^4)C(O)O-Q-N(R^5)(R^6) \quad (5)$$

wherein $R^4$ is a hydrogen atom or a methyl group, Q is a group having one, some or all of hydrogen atoms in a $C_{2-3}$ alkylene group, substituted by hydroxy groups, or a $C_{2-4}$ alkylene group, and each of $R^5$ and $R^6$ which are independent of each other, is a benzyl group or a $C_{1-8}$ alkyl group, or $R^5$ and $R^6$ are bonded to form a morpholino group, a piperidino group or a pyrrolidinyl group together with the nitrogen atom.

The organic acid having a pKa of from 2.0 to 4.0 is preferably at least one member selected from the group consisting of lactic acid, citric acid, malic acid and itaconic acid.

The water/oil resistant composition of the present invention preferably further contains an adjuvant.

It may contains, as the adjuvant, at least one member selected from the group consisting of an anionic paper strength enhancing agent, an anionic defoaming agent, an anionic sizing agent and an anionic chelating agent.

The above fluorinated copolymer preferably further contains structural units based on the following monomer (c):

Monomer (c): a compound represented by the following formula (6):

$$CH_2=C(R^1)-G-(R^2O)_q—R^3 \quad (6)$$

wherein $R^1$ is a hydrogen atom or a methyl group, G is a group represented by the following formula (7-1) or (7-2), $R^2$ is a $C_{2-4}$ alkylene group and two or more alkylene groups different in the number of carbon atoms may be contained in one molecule, q is an integer of from 1 to 50, and $R^3$ is a hydrogen atom or a methyl group, $$C(O)O—(CH_2)_r— \quad (7-1)$$

$$—C(O)O—(CH_2)_r—NHC(O)O— \quad (7-2)$$

wherein r is an integer of from 0 to 4.

The above fluorinated copolymer preferably further contains structural units based on the following monomer (d):

Monomer (d): a compound having a blocked isocyanate group, an alkoxysilyl group, a glycidyl group or an oxyalkylene group, and a polymerizable unsaturated group, and not having a polyfluoroalkyl group, and when it has a polyoxyalkylene group, it has polymerizable unsaturated groups at both terminals (provided that monomers (a) to (c) are excluded).

The water/oil resistant paper of the present invention is one having a base material treated with the water/oil resistant composition of the present invention.

The process for producing a water/oil resistant composition of the present invention comprises a step of polymerizing a monomer mixture comprising from 50 to 98 mass % of the above monomer (a) and from 2 to 50 mass % of the above monomer (b) to obtain a fluorinated copolymer, and a step of converting some or all of $—N(R^5)(R^6)$ in the fluorinated copolymer to form a salt with an organic acid comprising an organic acid having a pKa of from 2.0 to 4.0 and dispersing or dissolving the fluorinated copolymer in a medium.

The above organic acid is preferably from 5 to 80 parts by mass per 100 parts by mass of the fluorinated copolymer.

The above organic acid having a pKa of from 2.0 to 4.0 is preferably at least one member selected from the group consisting of lactic acid, citric acid, malic acid and itaconic acid.

The process for producing a water/oil resistant composition of the present invention preferably further contains a step of adding an adjuvant.

The adjuvant may be at least one member selected from the group consisting of an anionic paper strength enhancing agent, an anionic defoaming agent, an anionic sizing agent and an anionic chelating agent.

The above monomer mixture preferably further contains the above monomer (c).

The above monomer mixture preferably further contains the above monomer (d).

The process for producing water/oil resistant paper of the present invention comprises treating a base material with the water/oil resistant composition obtained by the process of the present invention.

Advantageous Effects of Invention

The water/oil resistant composition of the present invention can impart a sufficient water/oil resistance to a base material even though a fluorinated copolymer having $R^f$ groups with at most 6 carbon atoms or perfluoropolyether is used, and the water/oil resistance is not substantially influenced by the pH of dilution water or the adjuvant used at the time of treating paper with the water/oil resistant composition. Further, the composition has little odor.

By the process for producing a water/oil resistant composition of the present invention, it is possible to produce a water/oil resistant composition, whereby a sufficient water/oil resistance can be imparted to a base material even though a fluorinated copolymer having $R^f$ group with at most 6 carbon atoms or perfluoropolyether is used, and the water/oil resistance is not substantially influenced by the pH of dilution water or the adjuvant used at the time of treating paper with the water/oil resistant composition, and further the odor is little.

The article of the present invention has a sufficient water/oil resistance with a low environmental load.

By the process for producing an article of the present invention, it is possible to produce an article having a sufficient water/oil resistance with a low environmental load.

DESCRIPTION OF EMBODIMENTS

In this specification, a compound represented by the formula (1) will be referred to as a compound (1). Compounds represented by other formulae will also be referred to in the same manner. Further, in this specification, a group represented by the formula (2) will be referred to as a group (2). Groups represented by other formulae will also be referred to in the same manner. Further, a (meth)acrylate in this specification means an acrylate or a methacrylate. Further, a monomer in this specification means a compound having a polymerizable unsaturated group. Further, an $R^f$ group in this specification is a group having one, some or all of hydrogen atoms in an alkyl group substituted by fluorine atoms, and an $R^F$ group is a group having all hydrogen atoms in an alkyl group substituted by fluorine atoms.

<Water/Oil Resistant Composition>

A water/oil resistant composition of the present invention is one having a fluorinated copolymer dispersed or dissolved in a medium, wherein the fluorinated copolymer is one having some or all of —$N(R^5)(R^6)$ in a fluorinated copolymer comprising structural units based on a monomer (a) and structural units based on a monomer (b), and, as the case requires, structural units based on a monomer (c), structural units based on a monomer (d) and structural units based on a monomer (e), converted to form a salt with a specific organic acid, and, as the case requires, an adjuvant may be added thereto, or it may be diluted with water.

(Monomer (a))

Monomer (a) is a compound (1).

$$(Z—Y)_n X \quad (1)$$

Z is a $C_{1-6}$ $R^f$ group or a group (2).

$$C_m F_{2m+1} O(CF_2 CF(CF_3)O)_d CF(CF_3)— \quad (2)$$

wherein m is an integer of from 1 to 6, and d is an integer of from 1 to 4.

Z and $C_m F_{2m+1}$ may be linear or branched, but preferably linear. Z is preferably a $C_{1-6}$ $R^F$ group, more preferably a $C_{3-6}$ $R^F$ group, further preferably $F(CF_2)_4—$, $F(CF_2)_5—$ or $F(CF_2)_6—$.

Y is a bivalent organic group or a single bond.

Y is preferably a bivalent organic group having no fluorine atom, more preferably a group (8).

$$—R^M\text{-}T\text{-}R^N— \quad (8)$$

wherein each of $R^M$ and $R^N$ which are independent of each other, is a single bond or a $C_{1-22}$ hydrocarbon group (which may contain an etheric oxygen atom), T is a single bond, —OC(O)NH—, —C(O)NH—, —OC(O)O—, —C(O)O—, —SO$_2$NH—, —SO$_2$N(R')— or —NHCONH—, and R' is a $C_{1-6}$ alkyl group.

The group (8) is preferably a $C_{1-10}$ alkylene group, —CH=CHCH$_2$—, —(CH$_2$CH(R'')O)$_j$CH$_2$CH$_2$— (wherein j is an integer of from 1 to 10, and R'' is a hydrogen atom or a methyl group), —C$_2$H$_4$OC(O)NHC$_2$H$_4$—, —C$_2$H$_4$OC(O)OC$_2$H$_4$— or —C(O)OC$_2$H$_4$—, more preferably a $C_{1-10}$ alkylene group, further preferably —CH$_2$—, —CH$_2$CH$_2$—, —(CH$_2$)$_{11}$— or —CH$_2$CH$_2$CH(CH$_3$)—.

n is 1 or 2.

When n is 2, two (Z—Y) present in one molecule may be the same or different.

X is any one of groups (3-1) to (3-5) when n is 1, or any one of groups (4-1) to (4-4) when n is 2.

$$—C(R)=CH_2 \quad (3\text{-}1)$$

$$—C(O)OC(R)=CH_2 \quad (3\text{-}2)$$

$$—OC(O)C(R)=CH_2 \quad (3\text{-}3)$$

$$—OCH_2\text{-}\varphi\text{-}C(R)=CH_2 \quad (3\text{-}4)$$

$$—OCH=CH_2 \quad (3\text{-}5)$$

wherein R is a hydrogen atom, a methyl group or a halogen atom, and φ is a phenylene group, $$—CH[—(CH_2)_p C(R)=CH_2]— \quad (4\text{-}1)$$

$$—CH[—(CH_2)_p C(O)OC(R)=CH_2]— \quad (4\text{-}2)$$

$$—CH[—(CH_2)_p OC(O)C(R)=CH_2]— \quad (4\text{-}3)$$

$$—OC(O)CH=CHC(O)O— \quad (4\text{-}4)$$

wherein R is a hydrogen atom, a methyl group or a halogen atom, and p is an integer of from 0 to 4.

X is preferably the group (3-3) or the group (4-4), more preferably the group (3-3) in that the solubility in a solvent is thereby excellent, and the solution polymerization can easily be carried out.

R is preferably a hydrogen atom, a halogen atom (such as a fluorine atom or a chlorine atom) or a $C_{1-3}$ alkyl group, in that the polymerizability is thereby excellent. The alkyl group is more preferably a methyl group.

The monomer (a) is preferably a compound wherein Z is a $C_{1-6}$ (preferably $C_{3-6}$) $R^F$ group, Y is a bivalent organic group having no fluorine atom, X is the group (3-3) (when n is 1) or the group (4-4) (when n is 2), and R is a hydrogen atom, a methyl group or a halogen atom, particularly preferably a compound (1-1).

$$F(CF_2)_s Y^1 OC(O)C(R)=CH_2 \quad (1\text{-}1)$$

wherein s is an integer of from 1 to 6 (preferably from 3 to 6), R is a hydrogen atom, a methyl group or a halogen atom, and $Y^1$ is a $C_{1-10}$ alkylene group.

As the compound (1-1), the following compounds are preferred.

$$F(CF_2)_6 CH_2 CH_2 OC(O)C(CH_3)=CH_2,$$

$$F(CF_2)_6 CH_2 CH_2 OC(O)CH=CH_2,$$

$$F(CF_2)_4 CH_2 CH_2 OC(O)C(CH_3)=CH_2.$$

As the monomer (a), one type may be used alone, or two or more types may be used in combination.

(Monomer (b))

The monomer (b) is a compound (5).

$$CH_2=C(R^4)C(O)O\text{-}Q\text{-}N(R^5)(R^6) \quad (5)$$

$R^4$ is a hydrogen atom or a methyl group.

Q is a group having one, some or all of hydrogen atoms in a $C_{2-3}$ alkylene group substituted by hydroxy groups, or a $C_{2-4}$ alkylene group.

Q is preferably a $C_{2-4}$ alkylene group.

Each of $R^5$ and $R^6$ which are independent of each other, is a benzyl group or a $C_{1-8}$ alkyl group, or $R^5$ and $R^6$ are bonded to form a morpholino group, a piperidino group or a pyrrolidinyl group together with the nitrogen atom.

Each of $R^5$ and $R^6$ is preferably a $C_{1-8}$ alkyl group, particularly preferably a methyl group or an ethyl group.

The monomer (b) includes acrylates and methacrylates of the following amino alcohols.

Dimethylamino-2-ethanol, diethylamino-2-ethanol, diproylamino-2-ethanol, diisobutylamino-2-ethanol, N-tert-butylamino-2-ethanol, N-tert-butyl-N-methylamino-2-ethanol, morpholino-2-ethanol, N-ethyl-N-(ethyl-2-hexyl) amino-2-ethanol, piperizino-2-ethanol, (pyrrolidinyl-1)-2-ethanol, diethylamino-3-propanol-1, diethylamino-2-propanol-1, dimethylamino-1-propanol-2, diethylamino-4-butanol-1, diisobutylamino-4-butanol-1, dimethylamino-1-butanol-2, and dimethylamino-4-butanol-2.

These esters may be synthesized, for example, by a method disclosed in U.S. Pat. No. 2,138,763. The monomer (b) is particularly preferably dimethylaminoethyl methacrylate or diethylaminoethyl methacrylate.

As the monomer (b), one type may be used alone, or two or more types may be used in combination.

(Monomer (c))

The monomer (c) is a compound (6).

$$CH_2=C(R^1)\text{-}G\text{-}(R^2O)_q\text{-}R^3 \quad (6)$$

$R^1$ is a hydrogen atom or a methyl group.

G is a group (7-1) or a group (7-2).

$$-C(O)O-(CH_2)_r- \quad (7\text{-}1)$$

$$-C(O)O-(CH_2)_r-NHC(O)O- \quad (7\text{-}2)$$

wherein r is an integer of from 0 to 4.

G is preferably the group (7-1).

$R^2$ is a $C_{2-4}$ alkylene group. Two or more alkylene groups different in the number of carbon atoms may be contained in one molecule. In such a case, the arrangement of two or more oxyalkylene groups different in the number of carbon atoms may be block or random.

q is an integer of from 1 to 50, preferably from 1 to 9, more preferably from 1 to 4.

$R^3$ is a hydrogen atom or a methyl group.

$R^3$ is more preferably a hydrogen atom.

As the monomer (c), the following compounds are preferred.

2-Hydroxyethyl (meth)acrylate, 2-hydroxypropyl (meth) acrylate, 2-hydroxybutyl (meth)acrylate, 4-hydroxybutyl (meth)acrylate, polyoxyethylene glycol mono(meth)acrylate, polyoxypropylene glycol mono(meth)acrylate, and methoxypolyoxyethylene glycol (meth)acrylate.

The monomer (c) is particularly preferably 2-hydroxyethyl methacrylate. As the monomer (c), one type may be used alone, or two or more types may be used in combination.

(Monomer (d))

The monomer (d) is a compound having a blocked isocyanate group, an alkoxysilyl group, a glycidyl group or an oxyalkylene group, and a polymerizable unsaturated group, and not having an $R^f$ group, and when it has a polyoxyalkylene group, it has polymerizable unsaturated groups at both terminals (provided that monomers (a) to (c) are excluded).

As the compound having a blocked isocyanate group and a polymerizable unsaturated group, the following compounds may be mentioned.

A 2-butanoneoxime adduct of 2-isocyanate ethyl (meth) acrylate, a pyrazole adduct of 2-isocyanate ethyl (meth) acrylate, a 3,5-dimethylpyrazole adduct of 2-isocyanate ethyl (meth)acrylate, a 3-methylpyrazole adduct of 2-isocyanate ethyl (meth)acrylate, an ε-caprolactam adduct of 2-isocyanate ethyl (meth)acrylate, a 2-butanoneoxime adduct of 3-isocyanate propyl (meth)acrylate, a pyrazole adduct of 3-isocyanate propyl (meth)acrylate, a 3,5-dimethylpyrazole adduct of 3-isocyanate propyl (meth)acrylate, a 3-methylpyrazole adduct of 3-isocyanate propyl (meth)acrylate, a 3-methylpyrazole adduct of 3-isocyanate propyl (meth)acrylate, an ε-caprolactam adduct of 3-isocyanate propyl (meth) acrylate, a 2-butanoneoxime adduct of 4-isocyanate butyl (meth)acrylate, a pyrazole adduct of 4-isocyanate butyl (meth)acrylate, a 3,5-dimethylpyrazole adduct of 4-isocyanate butyl (meth)acrylate, a 3-methylpyrazole adduct of 4-isocyanate butyl (meth)acrylate, and an ε-caprolactam adduct of 4-isocyanate butyl (meth)acrylate.

As the compound having an alkoxysilyl group and a polymerizable unsaturated group, a compound (9) may be mentioned.

$$CH_2=C(R^7)\text{-}D\text{-}E\text{-}Si(R^a)(R^b)(R^c) \quad (9)$$

wherein D is —C(O)O— or a single bond, E is a $C_{1-4}$ alkylene group, each of $R^a$, $R^b$ and $R^c$ which are independent of one another, is a $C_{1-6}$ alkyl group or a $C_{1-6}$ alkoxy group, and $R^7$ is a hydrogen atom or a methyl group.

The compound (9) may, for example, be 3-methacryloyloxypropyl trimethoxysilane, 3-methacryloyloxypropyl dimethoxymethylsilane, 3-methacryloyloxypropyl triethoxysilane, 3-methacryloyloxypropyl diethoxyethylsilane or allyltrimethoxysilane.

As the compound having a glycidyl group and a polymerizable unsaturated group, the following compounds may be mentioned.

Glycidyl (meth)acrylate, and polyoxyalkylene glycol monoglycidyl ether (meth)acrylate.

As the compound having an oxyalkylene group and having polymerizable unsaturated groups at both terminals, a compound (10) may be mentioned.

$$CH_2=CR'\text{-}D\text{-}L\text{-}D\text{-}CR'=CH_2 \quad (10)$$

Wherein L is $-(C_2H_4O)_i-$, $-(C_3H_6O)_i-$, $-(C_4H_8O)_i-$, a $C_{1-15}$ linear or branched alkylene group, or a group containing —NHCO—, wherein i is an integer of from 1 to 200.

Each D is independently —OC(O)—, —C(O)O— or a single bond.

Each R' is independently a hydrogen atom or a methyl group.

The compound (10) may be ethylene glycol di(meth) acrylate, triethylene glycol di(meth)acrylate, tetraethylene glycol di(meth)acrylate, polyethylene glycol di(meth)acrylate, propylene glycol di(meth)acrylate, polypropylene glycol di(meth)acrylate, polytetramethylene glycol di(meth) acrylate, 1,6-hexandiol di(meth)acrylate, neopentyl glycol di(meth)acrylate, poly(ethylene glycol-propylene glycol) di(meth)acrylate, poly(ethylene glycol-tetramethylene glycol) di(meth)acrylate, poly(propylene glycol-tetramethylene glycol) di(meth)acrylate, diethylene glycol diglycidyl di(meth)acrylate, polyethylene glycol diglycidyl di(meth) acrylate, propylene glycol diglycidyl di(meth)acrylate, polypropylene glycol di(meth)acrylate, glycerin diglycidyl ether di(meth)acrylate, 2-hydroxy-3-acryloyloxypropyl methacrylate, allyloxypolyethylene glycol mono(meth)acrylate, allyloxypoly(ethylene glycol-propylene glycol) mono(meth) acrylate, glycerin di(meth)acrylate, oxyalkylene glycol mono(meth)acrylate monoisocyanatoethyl (meth)acrylate, or oxyalkylene glycol diisocyanatoethyl (meth)acrylate. The compound (10) is preferably triethylene glycol di(meth) acrylate.

As the monomer (d), one type may be used alone, or two or more types may be used in combination.

(Monomer (e))

The monomer (e) is a monomer other than the monomers (a) to (d).

The monomer (e) may, for example, be ethylene, vinylidene chloride, vinyl chloride, (meth)acrylic acid, vinylidene fluoride, vinyl acetate, vinyl propionate, vinyl isobutanoate, vinyl isodecanoate, vinyl stearate, cetyl vinyl ether, dodecyl vinyl ether, isobutyl vinyl ether, ethyl vinyl ether, 2-chloroethyl vinyl ether, styrene, α-methylstyrene, p-methylstyrene, (meth)acrylamide, N,N-dimethyl (meth) acrylamide, diacetone (meth)acrylamide, methylol-modified diacetone (meth)acrylamide, vinyl alkyl ketone, butadiene, isoprene, chloroprene, benzyl (meth)acrylate, a (meth)acrylate having a polycyloxane, allyl acetate, N-vinylcarbazole, maleimide or N-methylmaleimide.

(Fluorinated Copolymer)

The proportion of structural units based on the monomer (a) is from 50 to 98 mass %, preferably from 60 to 90 mass %, more preferably from 60 to 80 mass %, in the structural units (100 mass %) based on all monomers, in view of the water/oil resistance.

The proportion of structural units based on the monomer (b) is from 2 to 50 mass %, preferably from 5 to 30 mass %, more preferably from 5 to 25 mass %, in the structural units (100 mass %) based on all monomers, from the viewpoint of the dispersibility or solubility in the medium.

The proportion of structural units based on the monomer (c) is preferably from 0 to 30 mass %, in the structural units (100 mass %) based on all monomers, and with a view to improvement of the affinity with pulp, it is more preferably from 1 to 25 mass %, particularly preferably from 5 to 20 mass %.

The proportion of structural units based on the monomer (d) is preferably from 0 to 5 mass % in the structural units (100 mass %) based on all monomers, and from the viewpoint of the durability, it is more preferably from 0 to 4 mass %, particularly preferably from 0 to 2 mass %.

The proportion of structural units based on the monomer (e) is preferably from 0 to 30 mass % in the structural units (100 mass %) based on all monomers, and from the viewpoint of the film-forming property and the barrier property, it is more preferably from 0 to 10 mass %, particularly preferably from 0 to 1 mass %.

The proportion of structural units based on a monomer is obtained by an NMR (nuclear magnetic resonance) analysis and an elemental analysis. Further, in a case where it cannot be obtained by an NMR analysis or an elemental analysis, it may be calculated based on the charged amount of the monomer at the time of the preparation of the fluorinated copolymer.

The mass average molecular weight of the fluorinated copolymer is preferably from 5,000 to 100,000, more preferably from 20,000 to 90,000. When the mass average molecular weight is at least 5,000, the water/oil resistance will be good. When the mass average molecular weight is at most 100,000, the film-forming property and liquid stability will be good.

The mass average molecular weight of the fluorinated copolymer is a molecular weight calculated as a polymethyl methacrylate obtained by a measurement by gel permeation chromatography, using a calibration curve prepared by using a standard polymethyl methacrylate sample.

(Organic Acid)

The organic acid in the present invention is an organic acid which can convert some or all of —N($R^5$)($R^6$) in a fluorinated copolymer to form a salt with the organic acid, and it is preferred that all are converted to form a salt with the organic acid. The amount of the organic acid is preferably an amount whereby it is possible to convert all of —N($R^5$)($R^6$) in the fluorinated copolymer to form a salt.

As the organic acid, an organic acid having a pKa (pKa1 in a case where a plurality of carboxy groups are present in one molecule) of from 2.0 to 4.0.

The organic acid having a pKa of from 2.0 to 4.0 may, for example, be lactic acid (pKa:3.66), citric acid (pKa1:2.87), malic acid (pKa1:3.24), itaconic acid (pKa:3.85), tartaric acid (pKa1:2.82), fumaric acid (pKa1:2.85), succinic acid (pKa1:4.00), or formic acid (pKa:3.55), and from the viewpoint of the safety, water dispersibility and stability of the salt-form polymer, it is preferably one member selected from the group consisting of lactic acid, citric acid, malic acid and itaconic acid. Particularly preferred is lactic acid or malic acid.

As the organic acid, other organic acids having a pKa of less than 2.0 or more than 4.0 may be additionally used within a range not to impair the effects of the present invention. As such other organic acids, acetic acid (pKa: 4.56), adipic acid (pKa:4.26, 5.03), propionic acid (pKa: 4.67), oxalic acid (pKa:1.04, 3.82), maleic acid (pKa:1.75), etc. may be mentioned. The content of such other organic acids is preferably at most 40 mass %, more preferably at most 30 mass %, particularly preferably from 0 to 10 mass %, based on all organic acids.

The pKa is values disclosed in "Kagaku Binran Kisohen II" (3rd edition, complied by the Chemical Society of Japan, published by Maruzen).

(Medium)

Conversion of —N($R^5$)($R^6$) in the fluorinated copolymer to form a salt with an organic acid, can be carried out by using a medium.

As the medium to be used for the conversion to form a salt, an aqueous medium is preferred from the viewpoint of the handling efficiency and safety.

As the aqueous medium, water or an azeotropic mixture containing water may be mentioned, and water is preferred.

As the azeotropic mixture containing water, a mixture of water with the following compound is preferred.

The compound is preferably at least one member selected from the group consisting of propylene glycol, propylene glycol monomethyl ether, dipropylene glycol monomethyl ether, dipropylene glycol, tripropylene glycol and diacetone alcohol.

The aqueous medium is preferably one wherein the content of a volatile organic solvent is at most 1 mass %.

The volatile organic solvent is meant for an organic solvent which evaporates when stored at room temperature. Specifically, it is an organic solvent having a boiling point of at most 100° C. Here, a solvent forming an azeotropic mixture together with water is considered to be not included in such a volatile organic solvent.

The amount of the medium is suitably selected within a range of from 150 to 100,000 parts by mass, preferably from 150 to 1,000 parts by mass, per 100 parts by mass of the fluorinated copolymer.

(Adjuvant)

In the internal sizing, known internal sizing agents to be used in a common step for preparation of paper making materials, may be used in combination. Here, there is no particular restriction with respect to the ionic nature of the internal sizing agents, the addition order of the internal sizing agents or the number of the internal sizing agents. As such known internal sizing agents, a coagulating agent, a retention aid, a sizing agent, a paper strength enhancing agent, a pigment, a dye, a pH adjusting agent, etc. may be mentioned.

Specific examples of the coagulating agent or retention aid include, for example, aluminum sulfate, polyammonium chloride, polyammonium nitrate/sulfate, polydiallyldimethyl ammonium chloride, polyethyleneimine, polyamine, a diallylamine/acrylamide copolymer, polyamideamine epichlorohydrin, cationic starch, amphoteric polyacrylamide, anionic polyacrylamide, cationic polyacrylamide, a polyamide epoxy resin, a polyamine epichlorohydrin resin, colloidal silica, a polyphenol resin, polyvinylamine, a phenol/formaldehyde resin, polyethylene oxide, carboxymethylcellulose, bentonite, etc.

The adjuvant in the external sizing may, for example, be a paper strength enhancing agent (various starches, resins, etc.), a sizing agent, a penetrating agent, a defoaming agent, a chelating agent, a dye, a pigment, a dyestuff, a binder, an acid, an alkali, an alginate or aluminum sulfate.

The resin as an adjuvant may, for example, be polyvinyl alcohol, a polyamideamine resin, a polyamideamine epichlorohydrin-modified resin, urea or a melamine formaldehyde condensate or precondensate, a methylol/dihydroxyethylene/urea or its derivative, uronate, a methylol/ethylene/urea, a methylol/propylene/urea, a methylol/triazone, or a dicyandiamide/formaldehyde condensate.

The penetrating agent as an adjuvant may, for example, be a dendrimer alcohol type penetrating agent or an acetylene glycol type penetrating agent.

The defoaming agent as an adjuvant may, for example, be a silicone type defoaming agent, a dendrimer alcohol type defoaming agent, or an acetylene glycol type defoaming agent.

In the present invention, an anionic, cationic or nonionic adjuvant may be used.

The anionic adjuvant is preferably at least one member selected from the group consisting of an anionic paper strength enhancing agent, an anionic defoaming agent, an anionic sizing agent and an anionic chelating agent.

The anionic paper strength enhancing agent may, for example, be a phosphate starch, an oxidized starch, an amphoteric starch, an enzyme-modified starch, a carboxymethylated guar gum, an oxidized guar gum, a carboxymethylcellulose NA, an anionic polyvinyl alcohol, an acrylic resin, an anionic polyacrylamide, an amphoteric polyacrylamide, an acrylamide/acrylic acid copolymer, a styrene/butadiene copolymer, a methyl methacrylate/butadiene copolymer, an acrylonitrile/butadiene copolymer, an acrylate copolymer, an acrylonitrile/styrene copolymer, a colloidal silica complex particle emulsion, or an olefin resin emulsion. Further, as a raw material for the above various starches, corn, potato, wheat, tapioca, sago palm or rice may, for example, be mentioned.

The anionic defoaming agent may, for example, be a fatty acid defoaming agent, a wax defoaming agent or an aliphatic alcohol derivative.

The anionic sizing agent may, for example, be a rosin soap sizing agent, a rosin emulsion sizing agent, a specially modified rosin sizing agent, an alkenyl succinic acid, an alkenyl succinic anhydride, an anionic alkyl ketene dimer, an olefin resin, a styrene resin, a styrene/acrylic resin, a styrene/maleic acid/acrylic resin, or a wax sizing agent.

The anionic chelating agent may, for example, be ethylenediamine tetraacetic acid or its salt, or diethylenetriamine pentaacetic acid or its salt.

Other anionic adjuvants include, for example, an anionic water-dispersed pigment, a pigment (such as kaolin clay, talc, calcium carbonate, titanium oxide or silica), a scale-preventing agent, an anticeptic, a release agent (a fatty acid calcium salt, or polyethylene wax), a coating binder (such as a styrene/butadiene copolymer, an acrylic acid ester or a polylactic acid), etc.

The cationic adjuvant may, for example, be a cationic sizing agent such as wax, AKD, ASA or a styrene resin, or a cationic paper strength enhancing agent such as a cationic starch, a cation-modified polyvinyl alcohol, a polyacrylamide, a polyamide epichlorohydrin resin, a polyamine epichlorohydrin resin, a melamine resin or a polyamide epoxy resin.

The nonionic adjuvant may, for example, be a nonionic paper strength enhancing agent such as polyvinyl alcohol, or a nonionic defoaming agent.

The amount of such adjuvant is preferably from 0.001 to 100 parts by mass, more preferably from 0.01 to 10 parts by mass, per 100 parts by mass of the medium.

<Process for Producing Water/Oil Resistant Composition>

The process for producing a water/oil resistant composition of the present invention is a process comprising the following steps (I) to (IV):

(I) a step of polymerizing the monomers (a) and (b), and, as the case requires, the monomers (c), (d) and (e) to obtain a fluorinated copolymer, (II) a step of converting some or all of —N($R^5$)($R^6$) in the fluorinated copolymer to form a salt with a specific organic acid, and dispersing or dissolving the fluorinated copolymer in a medium, (III) as the case requires, a step of removing a solvent used in the step (I), and (IV) as a case requires, a step of adding an adjuvant or diluting the composition with a medium.

(Step (I))

As the polymerization method, a solution polymerization method or an emulsion polymerization may, for example, be mentioned, and from the viewpoint of the polymerization stability, a solution polymerization method is preferred.

The solution polymerization method is a method of polymerizing the monomer mixture in a solvent, if necessary in the presence of a polymerization initiator or a chain transfer agent.

As the solvent, the following compounds may be mentioned.

A ketone (such as acetone, methyl ethyl ketone or methyl isobutyl ketone), an alcohol (such as isopropyl alcohol), a diacetone alcohol, an ester (such as ethyl acetate or butyl acetate), an ether (such as diisopropyl ether), an aliphatic hydrocarbon, an aromatic hydrocarbon, a halogenated hydrocarbon (such as perchloroethylene, trichloro-1,1,1-ethane, trichlorotrifluoroethane or dichloropentafluoropropane), N,N-dimethylformamide, N-methyl-pyrrolidone-2, butyroacetone, dimethylsulfoxide, glycol ether, water, derivatives thereof, etc.

As the solvent, one type may be used alone, or two or more types may be used in combination.

As the solvent, from the viewpoint of the operation efficiency in the step (Ill), an organic solvent having a relatively low boiling point, or an organic solvent which forms an azeotropic mixture with water, is preferred.

As the organic solvent having a relatively low boiling point, one having a boiling point under $1 \times 10^5$ Pa (hereinafter simply referred to as a boiling point) of at most 80° C. is preferred. Specifically, acetone or methanol may be mentioned. The organic solvent which forms an azeotropic mixture with water may, for example, be 2-propyl alcohol, methyl isobutyl ketone, methyl ethyl ketone, or a mixed solvent thereof.

As the polymerization initiator, ammonium persulfate, potassium persulfate, a peroxide (such as benzyl peroxide, lauryl peroxide, succinyl peroxide or tert-butyl peroxypivalate) or an azo compound may, for example, be preferred.

The azo compound may, for example, be dimethyl-2,2'-azobis(2-methylpropionate), 2,2'-azobis(2-methylbutyronitrile), 4,4'-azobis(4-cyanovaleric acid), 2,2'-azobis(4-methoxy-2,4-dimethylvaleronitrile), 2,2'-azobis(2,4- dimethylvaleronitrile), 2,2'-azobis(2,4-dimethylvaleronitrile), 2,2'-azobis(2-methylbutyronitrile), 2,2'-azobis[2-(2-imidazolin-2-yl)propane], 2,2'-azobisisobutyronitrile, 1,1'-azobis(2-cyclohexane-1-carbonitrile) or 2,2'-azobis{2-methyl-N-[1,1-bis(hydroxymethyl)-2-hydroxyethyl]propionamide}.

The polymerization initiator is more preferably ammonium persulfate, dimethyl-2,2'-azobis(2-methylpropionate) or 4,4'-azobis(4-cyanovaleric acid).

The chain transfer agent may, for example, be an alkylmercaptan (such as tert-dodecylmercaptan, n-dodecylmercaptan or stearyl mercaptan), aminoethanethiol, mercaptoethanol, thioglycolic acid, 2-mercaptopropionic acid or 2,4-diphenyl-4-methyl-1-pentene.

The proportion of the monomer (a) is from 50 to 98 mass %, preferably from 60 to 90 mass %, more preferably from 60 to 80 mass %, in the monomer mixture (100 mass %) from the viewpoint of the water/oil resistance.

The proportion of the monomer (b) is from 2 to 50 mass %, preferably from 5 to 30 mass %, more preferably from 5 to 25 mass %, in the monomer mixture (100 mass %), from the viewpoint of the dispersibility or solubility in the medium.

The proportion of the monomer (c) is preferably from 0 to 30 mass % in the monomer mixture (100 mass %), and with a view to improvement of the affinity with pulp, it is more preferably from 1 to 25 mass %, particularly preferably from 5 to 20 mass %.

The proportion of the monomer (d) is preferably from 0 to 5 mass % in the monomer mixture (100 mass %), and from the viewpoint of the durability, it is more preferably from 0 to 4 mass %, particularly preferably from 0 to 2 mass %.

The proportion of the monomer (e) is preferably from 0 to 30 mass % in the monomer mixture (100 mass %), and from the viewpoint of the film-forming property and barrier property, it is more preferably from 0 to 5 mass %, particularly preferably from 0 to 1 mass %.

The concentration of the monomer mixture is preferably from 5 to 60 mass %, more preferably from 10 to 40 mass %, in 100 mass % of all materials (including the solvent).

The amount of the polymerization initiator is preferably from 0.1 to 1.5 parts by mass, per 100 parts by mass of the monomer mixture.

The amount of the chain transfer agent is preferably from 0 to 1 part by mass, per 100 parts by mass of the monomer mixture.

The polymerization temperature is preferably within a range of from room temperature to the boiling point of the solution, and with a view to efficiently using the polymerization initiator, it is preferably at least the half-life temperature of the polymerization initiator, more preferably from 30 to 90° C.

(Step (II))

A specific organic acid and a medium are added to the fluorinated copolymer obtained in the step (I) to convert some or all of —N($R^5$)($R^6$) in the fluorinated copolymer to form a salt and thereby to disperse or dissolve the fluorinated copolymer in the medium.

The organic acid and the medium may be added in the order of the organic acid and then the medium, or the organic acid and the medium may be added at the same time.

As the specific organic acid, an organic acid comprising the above-described organic acid having a pKa of from 2.0 to 4.0 is used. The amount of the organic acid (including other organic acids) is preferably from 5 to 80 parts by mass, more preferably from 10 to 50 parts by mass, particularly preferably from 20 to 40 parts by mass, per 100 parts by mass of the fluorinated copolymer.

As the medium, the above-mentioned aqueous medium may be used in the same manner. The amount of the medium to be used at the time of the conversion to form a salt (not including the after-described medium for dilution) is preferably from 200 to 600 parts by mass, more preferably from 200 to 500 parts by mass, particularly preferably from 250 to 450 parts by mass, per 100 parts by mass of the fluorinated copolymer from the viewpoint of the dispersibility or solubility of the fluorinated copolymer in the medium.

(Step (III))

Removal of the solvent is carried out, for example, by removing an organic solvent having a low boiling point from the solvent or the mixture of the solvent with water out of the system by a known method such as stripping (vaporizing) treatment, distillation or bubbling.

(Step (IV))

As the case requires, the above-described adjuvant may be added, or the composition may be diluted with a medium. The amount of the adjuvant is preferably from 0.001 to 100 parts by mass, more preferably from 0.01 to 10 parts by mass, per 100 parts by mass of the medium.

As the medium for dilution, the above-described aqueous medium is preferred, and water is more preferred. The amount of the medium for dilution is suitably adjusted for the processing within a range of from 150 to 100,000 parts by mass per 100 parts by mass of the monomer mixture.

Advantageous Effects

In the water/oil resistant composition of the present invention and the process for its production as described in the foregoing, some or all of —N($R^5$)($R^6$) in the fluorinated copolymer are converted to form a salt with an organic acid comprising an organic acid having a pKa of from 2.0 to 4.0, and the fluorinated copolymer is thereby dispersed or dissolved in a medium. Therefore, as compared with a conventional case where conversion to form a salt is carried out solely by acetic acid to disperse or dissolve the fluorinated copolymer in a medium, it is possible to impart a sufficient water/oil resistance to a base material even though a fluorinated copolymer having $R^f$ groups with at most 6 carbon atoms or perfluoropolyether, is used.

Further, some or all of —N($R^5$)($R^6$) in the fluorinated copolymer are converted to form a salt with an organic acid having a relatively low pKa thereby to disperse or dissolve the fluorinated copolymer in a medium, whereby the cationic fluorinated copolymer is less likely to be agglomerated by an anionic adjuvant or dilution water having a high pH used at the time of the treatment. Thus, the water/oil resistance is not substantially influenced by the adjuvant or the pH of dilution water used at the time of the treatment.

Further, no acetic acid is employed, whereby an odor is less.

<Article>

The article of the present invention is one having a base material treated with the water/oil resistant composition of the present invention.

Since the water/oil resistant composition of the present invention is suitable for treatment of paper, the article of the present invention is preferably water/oil resistant paper having paper treated with the water/oil resistant composition of the present invention.

As the base material, basically, paper, card board, pulp or related materials thereof may be mentioned.

As other base materials, for example, woven fabric or nonwoven fabric using cellulose or regenerated cellulose as the base, woven fabric or nonwoven fabric using natural or artificial fibers (such as cotton, cellulose acetate, wool or silk) as the base, woven fabric or nonwoven fabric using artificial fibers or synthetic fibers (such as polyamide fibers, polyester fibers, polyolefin fibers, polyurethane fibers or polyacrylonitrile fibers) as the base, leather, plastic material, glass, wood, metal, porcelain, brick, coated surface, etc. may be mentioned.

<Process for Producing Article>

The process for producing an article of the present invention is a process which comprises treating a base material with the water/oil resistant composition of the present invention.

The process for treating a base material with the water/oil resistant composition may, for example, be a process which comprises coating a base material with the water/oil resistant composition by means of a coating means or which comprises impregnating a base material with the water/oil resistant composition, followed by drying at a temperature of room temperature or higher, and as the case requires, applying heat treatment. By carrying out drying, heat treatment, etc. superior water/oil resistance can be obtained.

The process for producing an article of the present invention is suitable for the process for producing water/oil resistant paper, which comprises treating paper with the water/oil resistant composition of the present invention, since the water/oil resistant composition of the present invention is suitable for treatment of paper.

Now, the process for producing water/oil resistant paper will be described.

As a method for treating paper with the water/oil resistant composition, the following two types of methods are available.

(1) A method so-called "internal sizing" wherein the water/oil resistant composition is added to a pulp slurry before paper making.

(2) A method so-called "external sizing" wherein in size pressing after paper making, wet pressing and preliminary drying, the water/oil resistant composition is applied to paper, or after base paper making, the water/oil resistant composition is applied to paper by means of various coaters or various printing machines.

The internal sizing may be carried out at any stage so long as it is prior to adding the pulp slurry (paper making material) onto a wire of a paper making machine, and specifically, it may be carried out, for example, in a pulp production step or a paper material preparation step, preferably in a paper material preparation step.

Further, the paper making machine may be any machine so long as it is an apparatus capable of dehydrating the pulp slurry on the wire, and it includes, in addition to a continuous paper making machine such as a Foundrinear paper machine, a batch type pulp molding machine, whereby the pulp slurry is added onto a molding frame formed by a wire, and then dehydration is carried out below the wire to produce a molded product.

As pulp material, in addition to wood, any material may be used so long as it contains plant cellulose, such as glass, bamboo, rice straw, reed, bagasse, palm, etc.

Further, with respect to the pulping method, a known pulping method may be employed, such as a mechanical pulping method, a thermomechanical pulping method, a chemithermomechanical pulping method, a craft pulping method, a sulfite pulping method, a deinking pulping method or a recycling pulping method, and it is not particularly limited.

In the external sizing, any one of a sizing press, a coater and a printing machine may be used.

In the sizing press, analogous gate roll coater, two roll gate roll, metering size press, film size press, etc. may be utilized.

The coater may be either on machine or off machine, either single stage or multi stage, or either one side or both sides. The coater may, for example, be a blade coater, a rod blade coater, a bar coater, a cast coater, an air knife coater, a roll coater (such as a gate roll or a metering size press), a curtain coater, a gravure coater or a spray coater.

Further, as other external sizing means, various types of printing machines such as gravure, flexo, offset, etc., coaters, varnish-applying devices, sprays, brushing, padding, rollers, rotor dampening, foams, etc. may, for example, be mentioned.

In the present invention, it is preferred that after size pressing and coating, drying is carried out at a temperature of room temperature or higher, and as the case requires, heat treatment is applied. By carrying out drying, heat treatment, etc., superior water/oil resistance can be obtained.

EXAMPLES

Now, the present invention will be described in detail with reference to Examples and Comparative Examples, but it should be understood that the present invention is by no means limited thereto.

(Oil Resistance Test)

A kit test was carried out by the following method in accordance with TAPPI T559 cm-02 method. In the test, a test solution was used wherein castor oil, toluene and n-heptane were mixed in a volume ratio as shown in Table 1. A result of the test is represented by a kit No., and the larger the number, the better the oil resistance. The kit test is widely used for evaluation of the oil resistance of paper, since the oil resistance of test paper can thereby be obtained in a short time (about 20 seconds). The evaluation result has a meaning as an index against the surface tension of the surface of paper. An animal or plant oil or fat usually has a surface tension of at least 25 dyne/cm corresponding to a kit No. of from 6 to 7.

Test paper was placed on a clean flat black surface, and one droplet of a test solution of kit No. 16 was dropped on the test paper from a height of 13 mm. Upon expiration of 15 seconds from the dropping (contact time: 15 seconds), the dropped test solution was removed by a clean absorption paper, whereupon the surface of the test paper contacted with the test solution was visually observed. If the color of the surface was found to be dark, the same operation was carried out by using a test solution of kit No. 15, and the same operation was repeated by sequentially reducing the kit No. until the kit No. where the color of the surface no longer became dark. The evaluation is made by the first (largest) kit No. where the color of the surface no longer became dark.

TABLE 1

| Kit No. | Mixing ratio (vol %) | | |
| --- | --- | --- | --- |
| | Castor oil | Toluene | n-Heptane |
| 1 | 100 | 0 | 0 |
| 2 | 90 | 5 | 5 |

TABLE 1-continued

| Kit No. | Mixing ratio (vol %) | | |
|---|---|---|---|
| | Castor oil | Toluene | n-Heptane |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |
| 13 | 0 | 35 | 65 |
| 14 | 0 | 25 | 75 |
| 15 | 0 | 15 | 85 |
| 16 | 0 | 0 | 100 |

(Monomer (a))
C6FMA:F(CF$_2$)$_6$CH$_2$CH$_2$OC(O)C(CH$_3$)=CH$_2$
(Monomer (b))
DEAEMA: Diethylaminoethyl methacrylate
(Monomer (c))
HEMA: Hydroxyethyl methacrylate
(Monomer (d))
3ED: Triethylene glycol dimethacrylate
(Polymerization Initiator)
DAIB: Dimethyl-2,2'-azobisisobutyrate
(Fluorinated Copolymer Solution B)
Into a 1 L glass container, 132.8 g of C6FMA (purity: 99.6%), 15.8 g of HEMA, 26.3 g of DEAEMA, 0.2 g of 3ED, 524.9 g of acetone and 1.4 g of DAIB were charged, and nitrogen substitution was repeated three times. Polymerization was carried out at 65° C. for 20 hours at a stirring rotational speed of 350 rpm, to obtain a pale yellow fluorinated copolymer solution B having a solid content concentration of 25.2 mass %.
(Fluorinated Copolymer Solutions A, D and E)
Fluorinated copolymer solutions A, D and E were obtained in the same manner as for the fluorinated copolymer solution B except that the charges were changed as shown in Table 2. The mass average molecular weight (Mw) of the fluorinated copolymer in the fluorinated copolymer solution A was 62,000.

TABLE 2

| | | Fluorinated copolymer solution | | | |
|---|---|---|---|---|---|
| | | B | A | D | E |
| Charges (g) | C6FMA | 132.8 | 133.0 | 133.0 | 134.6 |
| | HEMA | 15.8 | 19.5 | 15.8 | 0 |
| | DEAEMA | 26.3 | 21.0 | 26.3 | 42.0 |
| | 3ED | 0.2 | 1.5 | 0 | 0 |
| | Acetone | 524.9 | 525.0 | 524.9 | 523.4 |
| | DAIB | 1.4 | 1.4 | 1.4 | 1.4 |
| Structural units (mass %) | Monomer (a) | 75.8 | 76.0 | 76.0 | 76.2 |
| | Monomer (b) | 15.0 | 12.0 | 15.0 | 23.8 |
| | Monomer (c) | 9.0 | 11.15 | 9.0 | 0 |
| | Monomer (d) | 0.1 | 0.85 | 0 | 0 |

(Water/Oil Resistant Composition 1)
To 50 g of the fluorinated copolymer solution B, 45 g of water and 2.1 g of DL-malic acid were added, followed by stirring for 15 minutes. Under a reduced pressure condition, acetone was removed at 65° C. to obtain a transparent pale orange aqueous dispersion. The solid content concentration was adjusted to be 20 mass % by ion-exchanged water to obtain a water/oil resistant composition 1.

(Water/Oil Resistant Compositions 2 to 13, W to Z)
Water/oil resistant compositions 2 to 13, W to Z, were obtained in the same manner as for the water/oil resistant composition 1 except that the charged amounts were changed as shown in Tables 3, 4 and 5.
Here, in Tables 3, 4 and 5, blank spaces mean that the charged amount is "0".

TABLE 3

| | | Water/oil resistant composition | | | | | | |
|---|---|---|---|---|---|---|---|---|
| | | 1 | 2 | 3 | 4 | 5 | 6 | 7 |
| Charges (g) | Fluorinated copolymer solution | B 50 | B 50 | B 50 | B 50 | B 50 | A 50 | A 50 |
| | Water | 45 | 43 | 41 | 44 | 44 | 45 | 45 |
| | Acetic acid | | | | | | 0.7 | 0.7 |
| | Lactic acid | | | | 2.7 | 1.4 | | 1.1 |
| | DL-malic acid | 2.1 | 4.2 | 6.2 | | | 2.1 | 1.7 |
| | Citric acid | | | | | | | |
| | Itaconic acid | | | | | | | |
| Amount (parts by mass) per 100 parts by mass of fluorinated copolymer | | | | | | | | |
| Organic acid | | 16.8 | 33.6 | 49.6 | 21.6 | 28 | 19.2 | 14.4 |
| medium | | 360 | 344 | 328 | 352 | 352 | 360 | 360 |

TABLE 4

| | | Water/oil resistant composition | | | | | |
|---|---|---|---|---|---|---|---|
| | | 8 | 9 | 10 | 11 | 12 | 13 |
| Charges (g) | Fluorinated copolymer solution | B 50 | B 50 | B 50 | B 50 | D 50 | E 50 |
| | Water | 45 | 41 | 45 | 43 | 43 | 40 |
| | Acetic acid | | | | | | |
| | Lactic acid | | | | | | |
| | DL-malic acid | | | | | 4.2 | 6.6 |
| | Citric acid | 1.9 | 5.8 | | | | |
| | Itaconic acid | | | 2.0 | 4.0 | | |
| Amount (parts by mass) per 100 parts by mass of fluorinated copolymer | | | | | | | |
| Organic acid | | 15.2 | 46.4 | 16 | 32 | 33.6 | 52.8 |
| medium | | 360 | 328 | 360 | 344 | 344 | 320 |

TABLE 5

| | | Water/oil resistant composition (Comparative Examples) | | | |
|---|---|---|---|---|---|
| | | W | X | Y | Z |
| Charges (g) | Fluorinated copolymer solution | A 50 | B 50 | D 50 | E 50 |
| | Water | 46 | 46 | 46 | 46 |
| | Acetic acid | 0.7 | 0.9 | 0.9 | 1.5 |
| | Lactic acid | | | | |
| | DL-malic acid | | | | |
| | Citric acid | | | | |
| | Itaconic acid | | | | |
| Amount (parts by mass) per 100 parts by mass of fluorinated copolymer | | | | | |
| Organic acid | | 5.6 | 7.2 | 7.2 | 12 |
| medium | | 368 | 368 | 368 | 368 |

In the following Examples, Examples 5 to 17, 19, 21, 23, 24, 26, 27, 29, 30, 32, 33, 35, 36, 38, 39 and 41 are Working Examples of the present invention, and Examples 1 to 4, 18, 20, 22, 25, 28, 31, 34, 37 and 40 are Comparative Examples.

Example 1

Into a 500 mL glass container, 30 g of oxidized starch and 270 g of water were charged. The solution was stirred at a stirring rotational speed of 100 rpm and heated from room temperature to 95° C. over a period of 20 minutes, and then, held for 30 minutes to obtain a semi-transparent aqueous dispersion. Then, the concentration of oxidized starch was adjusted to 10 mass % by ion-exchanged water to obtain an oxidized starch dispersion.

Into a 100 mL glass container to be hermetically sealed, 1.5 g of the water/oil resistant composition W, 30 g of the oxidized starch dispersion obtained as described above, 0.3 g of a nonionic penetrating agent (acetylene glycol type) and 68.2 g of ion-exchanged water at 60° C., were added and thoroughly mixed and then maintained in a 60° C. water bath, and the mixture thereby obtained was used as a test solution.

Papers A, B and C having a size of 15 cm×25 cm were treated with the test solution by a size press method. Then, the papers A, B and C treated with the test solution were heated and dried at 105° C. for 1 minute to obtain test papers. The results of oil resistance tests of the test papers are shown in Table 6.

Examples 5 to 15

Test solutions were prepared in the same manner as in Example 1 except that the water/oil resistant composition W was changed to water/oil resistant compositions 1 to 11, to obtain test papers. The results of oil resistance tests of the test papers are shown in Table 6.

Examples 2 to 4, 16 and 17

Test solutions were prepared in the same manner as in Example 1 except that the water/oil resistant composition W was changed to the water/oil resistant compositions X to Z, 12 and 13, to obtain test papers. The results of oil resistance tests of the test papers are shown in Table 6.

TABLE 6

| | Water/oil resistant composition | Polymer | Organic acid | Adjuvant 1 Type | Adjuvant 1 Mass % | Adjuvant 2 Type | Adjuvant 2 Mass % | Solid content in composition Mass % | Water Mass % | Oil resistance test Paper A | Paper B | Paper C | Paper D |
|---|---|---|---|---|---|---|---|---|---|---|---|---|---|
| Ex. 1 | W | A | Acetic acid | Oxidized starch | 3 | Penetrating agent | 0.3 | 0.3 | 96.4 | 0.5 | 2.5 | 1.5 | |
| Ex. 2 | X | B | Acetic acid | Oxidized starch | 3 | Penetrating agent | 0.3 | 0.3 | 96.4 | 1 | | | |
| Ex. 3 | Y | D | Acetic acid | Oxidized starch | 3 | Penetrating agent | 0.3 | 0.3 | 96.4 | 2.5 | | | |
| Ex. 4 | Z | E | Acetic acid | Oxidized starch | 3 | Penetrating agent | 0.3 | 0.3 | 96.4 | 1.5 | | | |
| Ex. 5 | 1 | B | Malic acid | Oxidized starch | 3 | Penetrating agent | 0.3 | 0.3 | 96.4 | 3 | 3 | | |
| Ex. 6 | 2 | B | Malic acid | Oxidized starch | 3 | Penetrating agent | 0.3 | 0.3 | 96.4 | 3.5 | 4 | | |
| Ex. 7 | 3 | B | Malic acid | Oxidized starch | 3 | Penetrating agent | 0.3 | 0.3 | 96.4 | 3 | | 3 | |
| Ex. 8 | 4 | B | Lactic acid | Oxidized starch | 3 | Penetrating agent | 0.3 | 0.3 | 96.4 | 3 | 4.5 | | |
| Ex. 9 | 5 | B | Malic acid + lactic acid | Oxidized starch | 3 | Penetrating agent | 0.3 | 0.3 | 96.4 | 3.5 | 4 | | |
| Ex. 10 | 6 | A | Malic acid + acetic acid | Oxidized starch | 3 | Penetrating agent | 0.3 | 0.3 | 96.4 | 2.5 | 3.5 | | |
| Ex. 11 | 7 | A | Lactic acid + acetic acid | Oxidized starch | 3 | Penetrating agent | 0.3 | 0.3 | 96.4 | 2.5 | 3.5 | | |
| Ex. 12 | 8 | B | Citric acid | Oxidized starch | 3 | Penetrating agent | 0.3 | 0.3 | 96.4 | | | 3.5 | |
| Ex. 13 | 9 | B | Citric acid | Oxidized starch | 3 | Penetrating agent | 0.3 | 0.3 | 96.4 | | | 3.5 | |
| Ex. 14 | 10 | B | Itaconic acid | Oxidized starch | 3 | Penetrating agent | 0.3 | 0.3 | 96.4 | | | 3 | |
| Ex. 15 | 11 | B | Itaconic acid | Oxidized starch | 3 | Penetrating agent | 0.3 | 0.3 | 96.4 | | | 3 | |
| Ex. 16 | 12 | D | Malic acid | Oxidized starch | 3 | Penetrating agent | 0.3 | 0.3 | 96.4 | 3.5 | | | |
| Ex. 17 | 13 | E | Malic acid | Oxidized starch | 3 | Penetrating agent | 0.3 | 0.3 | 96.4 | 2.5 | | | |

Example 18

To ion-exchanged water, 0.1 mass % of ethylenediamine tetrasodium tetraacetate (hereinafter referred to as EDTA-4Na) was added to adjust the pH to be 10.4 thereby to obtain EDTA-added water (ion-exchanged water having EDTA-4Na dissolved).

Into a 500 mL glass container, 30 g of oxidized starch and 270 g of the EDTA-added water obtained as described above, were charged. The solution was stirred at a stirring rotational speed of 100 rpm and heated from room temperature to 95° C. over a period of 20 minutes, and then held for 30 minutes to obtain a semi-transparent aqueous dispersion.

Then, the concentration of oxidized starch was adjusted to be 10 mass % by ion-exchanged water to obtain an oxidized starch dispersion.

Into a 100 mL glass container to be hermetically sealed, 1.5 g of the water/oil resistant composition W, 30 g of the oxidized starch dispersion obtained as described above, 0.3 g of a nonionic penetrating agent (acetylene glycol type) and 68.2 g of the EDTA-added water at 60° C. obtained as described above, were added and thoroughly mixed, and then, held in a 60° C. water bath, and the mixture thereby obtained was used as a test solution.

Paper C having a size of 15 cm×25 cm was treated with the test solution by a size press method. Then, the paper C treated with the test solution was heated and dried at 105° C. for 1 minute to obtain test paper. The result of the oil resistance test of the test paper is shown in Table 7.

Example 19

A test solution was prepared, and test paper was obtained in the same manner as in Example 18 except that the water/oil resistant composition W was changed to the water/oil resistant composition 2. The result of the oil resistance test of the test paper is shown in Table 7.

Example 20

To ion-exchanged water, 0.1 mass % of EDTA-4Na was added to adjust the pH to 10.4 to obtain EDTA-added water.

Into a 100 mL glass container to be hermetically sealed, 1.5 g of the water/oil resistant composition W, 0.3 g of a nonionic penetrating agent (acetylene glycol type) and 98.2 g of the EDTA-added water at 60° C. obtained as described above, were added and thoroughly mixed, and then held in a 60° C. water bath, and the mixture thereby obtained was used as a test solution.

Paper C having a size of 15 cm×25 cm was treated with the test solution by a size press method. Then, the paper C treated with the test solution was heated and dried at 105° C. for 1 minute to obtain test paper. The results of the oil resistance test of the test paper is shown in Table 7.

Example 21

A test solution was prepared, and test paper was obtained in the same manner as in Example 20 except that the water/oil resistant composition W was changed to the water/oil resistant composition 2. The result of the oil resistance test of the test paper is shown in Table 7.

Example 22

Into a 100 mL glass container to be hermetically sealed, 1.5 g of the water/oil resistant composition W and 98.5 g of ion-exchanged water at 60° C. were added and thoroughly mixed, and then held in a 60° C. water bath, and the mixture obtained was used as a test solution.

Paper D having a size of 15 cm×25 cm was treated with the test solution by a size press method. Then, the paper D treated with the test solution was heated and dried at 105° C. for 1 minute to obtain test paper. The results of the oil resistance test of the test paper is shown in Table 8.

Examples 23 and 24

Test solutions were prepared, and test papers were obtained in the same manner as in Example 22 except that the water/oil resistant composition W was changed to the water/oil resistant compositions 2 and 5. The results of the oil resistance tests of the test papers are shown in Table 8.

Example 25

Into a 500 mL glass container, 30 g of a hydroxyethyl ether-modified starch (hereinafter referred to as HES) and 270 g of water were charged. The solution was stirred at a stirring rotational speed of 100 rpm and heated from room temperature to 95° C. over a period of 20 minutes, and then held for 30 minutes to obtain a semi-transparent aqueous dispersion. Then, the concentration of HES was adjusted to be 10 mass % by ion-exchanged water to obtain a HES dispersion.

Into a 100 mL glass container to be hermetically sealed, 1.5 g of the water/oil resistant composition W, 30 g of the HES dispersion obtained as described above, and 68.5 g ion-exchanged water at 60° C. were added and then held in a 60° C. water bath, and the mixture thus obtained was used as a test solution.

Paper D having a size of 15 cm×25 cm was treated with the test solution by a size press method. Then, the paper D

TABLE 7

| | Water/oil resistant composition | Polymer | Organic acid | Adjuvant 1 Type | Adjuvant 1 Mass % | Adjuvant 2 Type | Adjuvant 2 Mass % | Solid content in composition Mass % | Water Mass % | Dilution water pH | Oil resistance test Paper A | Paper B | Paper C | Paper D |
|---|---|---|---|---|---|---|---|---|---|---|---|---|---|---|
| Ex. 18 | W | A | Acetic acid | Oxidized starch | 3 | Penetrating agent | 0.3 | 0.3 | 96.4 | 10 | | | 0 | |
| Ex. 19 | 2 | B | Malic acid | Oxidized starch | 3 | Penetrating agent | 0.3 | 0.3 | 96.4 | 10 | | | 3 | |
| Ex. 20 | W | A | Acetic acid | | | Penetrating agent | 0.3 | 0.3 | 99.4 | 10 | | | 0 | |
| Ex. 21 | 2 | B | Malic acid | | | Penetrating agent | 0.3 | 0.3 | 99.4 | 10 | | | 4 | | treated with the test solution was heated and dried at 105° C. for 1 minute to obtain test paper. The result of the oil resistance test of the test paper is shown in Table 8.

Examples 26 and 27

Test solutions were prepared, and test papers were obtained in the same manner as in Example 25 except that the water/oil resistant composition W was changed to the water/oil resistant compositions 2 and 5. The results of the oil resistance tests of the test papers are shown in Table 8.

Examples 29 and 30

Test solutions were prepared, and test papers were obtained in the same manner as in Example 28 except that the water/oil resistant composition W was changed to the water/oil resistant compositions 2 and 5. The results of the oil resistance tests of the test papers are shown in Table 8.

TABLE 8

| | Water/oil resistant composition | Polymer | Organic acid | Adjuvant 1 Type | Adjuvant 1 Mass % | Adjuvant 2 Type | Adjuvant 2 Mass % | Solid content in composition Mass % | Water Mass % | Oil resistance test Paper A | Paper B | Paper C | Paper D |
|---|---|---|---|---|---|---|---|---|---|---|---|---|---|
| Ex. 22 | W | A | Acetic acid | | | | | 0.3 | 99.7 | | | | 4 |
| Ex. 23 | 2 | B | Malic acid | | | | | 0.3 | 99.7 | | | | 5 |
| Ex. 24 | 5 | B | Malic acid + lactic acid | | | | | 0.3 | 99.7 | | | | 5.5 |
| Ex. 25 | W | A | Acetic acid | HES | 3 | | | 0.3 | 96.7 | | | | 5 |
| Ex. 26 | 2 | B | Malic acid | HES | 3 | | | 0.3 | 96.7 | | | | 6 |
| Ex. 27 | 5 | B | Malic acid + lactic acid | HES | 3 | | | 0.3 | 96.7 | | | | 6.5 |
| Ex. 28 | W | A | Acetic acid | PVA | 3 | | | 0.3 | 96.7 | | | | 5.5 |
| Ex. 29 | 2 | B | Malic acid | PVA | 3 | | | 0.3 | 96.7 | | | | 7 |
| Ex. 30 | 5 | B | Malic acid + lactic acid | PVA | 3 | | | 0.3 | 96.7 | | | | 7 | water/oil resistant compositions 2 and 5. The results of the oil resistance tests of the test papers are shown in Table 8.

Example 28

Into a 500 mL glass container, 30 g of a completely saponified polyvinyl alcohol (hereinafter referred to as PVA) and 270 g of water were charged. The solution was stirred at a stirring rotational speed of 100 rpm and heated from room temperature to 95° C. over a period of 20 minutes, and then held for 30 minutes to obtain a semi-transparent aqueous dispersion. Then, the concentration of PVA was adjusted to be 10 mass % by ion-exchanged water to obtain a PVA dispersion.

Into a 100 mL glass container to be hermetically sealed, 1.5 g of the water/oil resistant composition W, 30 g of the PVA dispersion obtained as described above, and 68.5 g ion-exchanged water at 60° C. were added and thoroughly mixed, and then held in a 60° C. water bath, and the mixture thus obtained was used as a test solution.

Paper D having a size of 15 cm×25 cm was treated with the test solution by a size press method. Then, the paper D treated with the test solution was heated and dried at 105° C. for 1 minute to obtain test paper. The result of the oil resistance test of the test paper is shown in Table 8.

Example 31

Into a 100 mL glass container to be hermetically sealed, 5.0 g of the water/oil resistant composition W, 70 g of ethanol (hereinafter referred to as EtOH), and 25 g ion-exchanged water were added and thoroughly mixed to obtain a test solution.

The test solution was applied to white paper boards A and B having a size of 15 cm×25 cm by means of No. 4 mayerbar. Then, the white paper boards A and B treated with the test solution was heated and dried at 105° C. for 1 minute to obtain test papers. The results of the oil resistance tests of the test papers are shown in Table 9.

Examples 32 and 33

Test solutions were prepared, and test papers were obtained in the same manner as in Example 31 except that the water/oil resistant composition W was changed to the water/oil resistant compositions 2 and 5. The results of the oil resistance tests of the test papers are shown in Table 9.

Example 34

Into a 500 mL glass container, 30 g of PVA and 270 g of water were charged. The solution was stirred at a stirring rotational speed of 100 rpm and heated from room temperature to 95° C. over a period of 20 minutes, and then held for 30 minutes to obtain a semi-transparent aqueous dispersion. Then, the concentration of PVA was adjusted to be 10 mass % by ion-exchanged water to obtain a PVA dispersion.

Into a 100 mL glass container to be hermetically sealed, 5.0 g of the water/oil resistant composition W, 40 g of EtOH, 10 g of the PVA dispersion obtained as described above, and 45 g ion-exchanged water were added and thoroughly mixed to obtain a test solution.

The test solution was applied to white boards A and B having a size of 15 cm×25 cm by means of No. 4 mayerbar, and the white boards A and B treated with the test solution were heated and dried at 105° C. for 1 minute to obtain test papers. The results of the oil resistance tests of the test papers are shown in Table 9.

Examples 35 and 36

Test solutions were prepared, and test papers were obtained in the same manner as in Example 34 except that the water/oil resistant composition W was changed to the water/oil resistant compositions 2 and 5. The results of the oil resistance tests of the test papers are shown in Table 9.

Example 37

Into a 100 mL glass container to be hermetically sealed, 5.0 g of the water/oil resistant composition W, 5 g of a nonionic penetrating agent (acetylene glycol type) and 90 g ion-exchanged water were added and thoroughly mixed to obtain a test solution.

The test solution was applied to white boards A and B having a size of 15 cm×25 cm by means of No. 4 mayerbar. Then, the white boards A and B treated with the test solution were heated and dried at 105° C. for 1 minute to obtain test papers. The results of the oil resistance tests of the test papers are shown in Table 9.

Examples 38 and 39

Test solutions were prepared, and test papers were obtained in the same manner as in Example 37 except that the water/oil resistant composition W was changed to the water/oil resistant compositions 2 and 5. The results of the oil resistance tests of the test papers are shown in Table 9.

TABLE 9

| | Water/oil resistant composition | Organic Polymer | acid | Adjuvant 1 Type | Mass % | Adjuvant 2 Type | Mass % | Solid content in composition Mass % | Water Mass % | Oil resistance test White board A | White board B |
|---|---|---|---|---|---|---|---|---|---|---|---|
| Ex. 31 | W | A | Acetic acid | EtOH | 70 | | | 1 | 29.0 | 5 | 3.5 |
| Ex. 32 | 2 | B | Malic acid | EtOH | 70 | | | 1 | 29.0 | 7 | 7.5 |
| Ex. 33 | 5 | B | Malic acid + lactic acid | EtOH | 70 | | | 1 | 29.0 | 6 | 6.5 |
| Ex. 34 | W | A | Acetic acid | EtOH | 40 | PVA | 1 | 1 | 58.0 | 6 | 5 |
| Ex. 35 | 2 | B | Malic acid | EtOH | 40 | PVA | 1 | 1 | 58.0 | 8 | 9 |
| Ex. 36 | 5 | B | Malic acid + lactic acid | EtOH | 40 | PVA | 1 | 1 | 58.0 | 8 | 9 |
| Ex. 37 | W | A | Acetic acid | | | Penetrating agent | 5 | 1 | 94.0 | 3 | 3 |
| Ex. 38 | 2 | B | Malic acid | | | Penetrating agent | 5 | 1 | 94.0 | 5 | 4.5 |
| Ex. 39 | 5 | B | Malic acid + lactic acid | | | Penetrating agent | 5 | 1 | 94.0 | 4 | 4 |

Example 40

By means of a disintegrator, bleached bagasse pulp was disintegrated under conditions of a pulp concentration of 3 mass % for 10 minutes to obtain a pulp slurry. The pulp slurry was diluted with water to 1.2 mass %, and then, with stirring, to the pulp solid content, 0.03 mass % of a coagulating agent (a polyamine epichlorohydrin resin) and 0.5 mass % (as solid content) of the water/oil resistant composition W were added at 3-minute intervals.

Then, a handmade paper was prepared in accordance with JIS P8222. Here, the sheet basis weight was 300 g/m$^2$, and the seat drying was carried out under conditions of 170° C. and 80 seconds. The results of the oil resistance test of the handmade paper is shown in Table 10.

Example 41

Handmade paper was prepared in the same manner as in Example 40 except that the water/oil resistant composition W was changed to the water/oil resistant composition 2. The result of the oil resistance test of the handmade paper is shown in Table 10.

TABLE 10

| Water/oil resistant composition | Polymer | Organic acid | Additive Type | Additive Mass % | Solid content in composition Mass % | Oil resistance test |
|---|---|---|---|---|---|---|
| Ex. 40 | W | A | Acetic acid | Coagulating agent | 0.03 | 0.5 | 3 |
| Ex. 41 | 2 | B | Malic acid | Coagulating agent | 0.03 | 0.5 | 3.5 |

INDUSTRIAL APPLICABILITY

Water/oil resistant paper obtained by treating paper with the water/oil resistant composition of the present invention is excellent in the water/oil resistance and has little odor, and thus it is useful for e.g. a packaging container for food products, wrapping paper for food products, wrapping paper for freshness-keeping agents, wrapping paper for deoxidants, etc.

The invention claimed is:

1. A process for producing a water/oil resistant paper comprising;
    coating or impregnating a paper with a water/oil resistant composition,
    drying the coated or impregnated paper at a temperature of room temperature or higher,
    wherein the water/oil resistant composition comprises a fluorinated copolymer, an oxidized starch as an anionic paper strength enhancing agent, and a medium,
    wherein the fluorinated copolymer has some or all of one or more dialkylamino groups in the fluorinated copolymer converted to form a salt with at least one of malic acid and lactic acid,
    wherein the fluorinated copolymer comprises from 60 to 90 mass % of structural units based on the following monomer (a), from 5 to 30 mass % of structural units based on the following monomer (b), from 1 to 25 mass % of structural units based on the following monomer (c), and from 0 to 5 mass % of structural units based on the following monomer (d),
    wherein the monomer (a) is $(CF_2)_6CH_2CH_2OC(O)C(CH_3)\!\!=\!\!CH_2$;
    wherein the monomer (b) is diethylaminoethyl methacrylate;
    wherein the monomer (c) is hydroxyethyl methacrylate; and
    wherein the monomer (d) is triethylene glycol dimethacrylate.

2. The process of claim 1, wherein a content of the with the malic acid and lactic acid is from 5 to 80 parts by mass per 100 parts by mass of the fluorinated copolymer.

3. The process of claim 1, wherein an amount of the oxidized starch is from 0.01 to 10 parts by mass per 100 parts by mass of the medium.

4. The process of claim 1, wherein a mass average molecular weight of the fluorinated copolymer is from 5,000 to 100,000.

5. The process of claim 1, wherein a mass average molecular weight of the fluorinated copolymer is from 20,000 to 90,000.

6. The process of claim 1, wherein the content of the structural units based on the monomer (a) is from 60 to 80 mass %.

7. The process of claim 1, wherein the content of the structural units based on the monomer (b) is from 5 to 25 mass %.

8. The process of claim 1, wherein the content of the structural units based on the monomer (c) is from 5 to 20 mass %.

9. The process of claim 1, wherein the content of the structural units based on the monomer (d) is from 2 to 5 mass %.

10. The process of claim 1, wherein the medium is an azeotropic mixture containing water and at least one compound selected from the group consisting of propylene glycol, propylene glycol monomethyl ether, dipropylene glycol monomethyl ether, dipropylene glycol, tripropylene glycol and diacetone alcohol, and wherein a content of a volatile organic solvent in the medium is at most 1 mass %.

11. The process of claim 1, wherein the water/oil resistant composition comprises a coagulating agent, a retention aid, a sizing agent, a paper strength enhancing agent, a pigment, a dye, a pH adjusting agent, or a combination thereof.

12. The process of claim 1, wherein the molar amount of the malic acid present in the water/oil resistant composition is greater than the molar amount of the dialkylamino groups of the fluorinated copolymer.

13. The process of claim 1, wherein the content of the structural units based on the monomer (b) is from 12.0 to 23.8 mass %.

14. The process of claim 1, wherein the malic acid is present in the water/oil resistant composition in an amount of from 15.2 to 49.6 parts per 100 parts of the fluorinated copolymer.

15. The process of claim 1, wherein the fluorinated copolymer consists of monomer units (a)-(d) and the organic acid is malic acid.

* * * * *